Aug. 11, 1959 R. E. LYNCH 2,898,682
VERNIER SCRIBING TOOL
Filed April 2, 1958
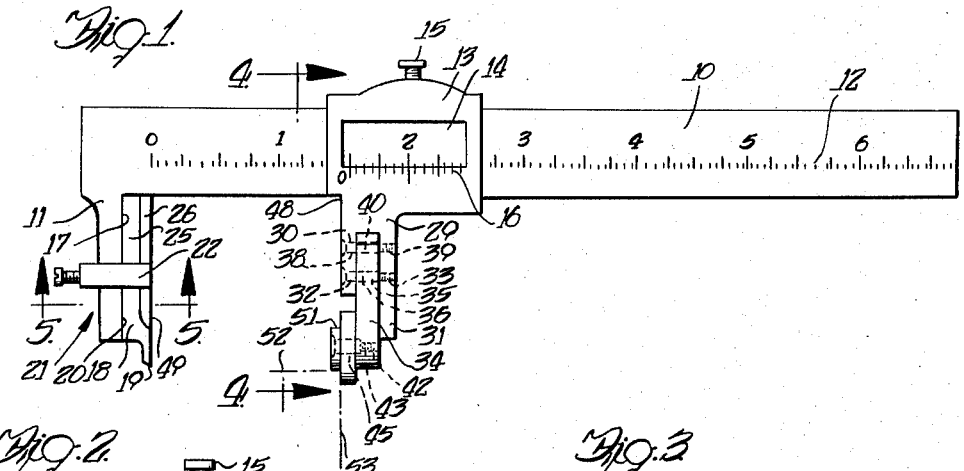
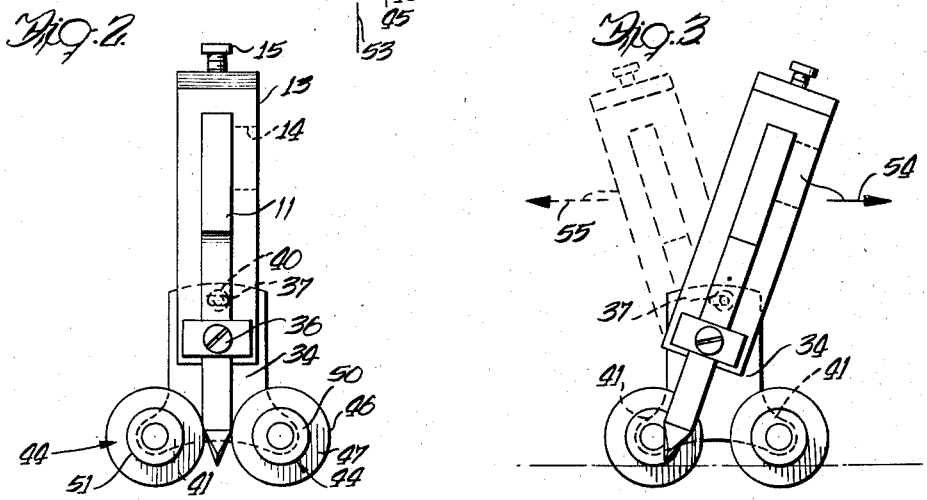
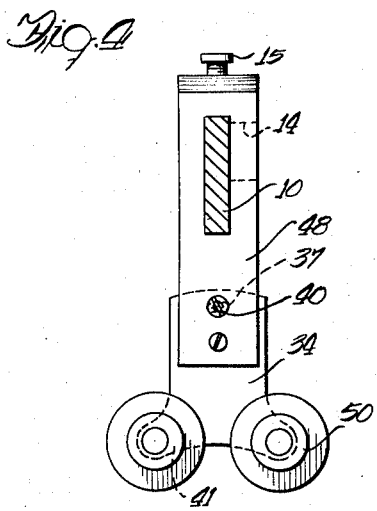
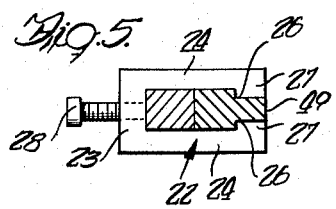
Inventor
Robert E. Lynch
Frederick J. Heubel
Attorney

United States Patent Office 2,898,682
Patented Aug. 11, 1959

2,898,682

VERNIER SCRIBING TOOL

Robert E. Lynch, Chicago, Ill.

Application April 2, 1958, Serial No. 726,000

15 Claims. (Cl. 33—42)

This invention relates to a new and improved vernier scribing tool, and more particularly to a unique device for quickly and easily scribing straight lines on a work surface which scribed lines are accurately and precisely spaced from a given surface disposed at right angles to the scribed work surface.

Heretofore, in the metal working industry and especially in the tool and die making field where precision and accuracy are essential, when it was desired to scribe a layout line on a flat work surface a given distance from a guide surface disposed perpendicular to the work surface, it was necessary to place the guide surface upon a plate known to be substantially flat. Obviously, the surface of the plate and the guide surface on the work piece had to be perfectly clean and free from debris, dirt, oil, etc. to insure an accurately scribed line. A height guage having a flat guide surface was then employed to scribe the line on the work piece by sliding the height guage surface on the surface of the flat plate. It is believed understandable that considerable time was expended by this method of scribing layout lines and the accuracy of the scribed lines depended on the cleanliness of the guide surfaces of the flat plate and the work piece. Furthermore, the set up time is further increased when it is realized that any one tool and die making department usually has but one such flat plate available because of the expense involved to make the plates. Thus time is wasted if the plate is already in use when needed or if not in use it may be located at a place remote from the place where it is to be used. It is, therefore, an important object of the present invention to provide a vernier scribing tool for efficiently, and accurately scribing lines on a work piece without the need of a flat guide plate and a height guage.

A still further object is to provide a vernier scribing tool with guide and support surfaces arranged with respect to the scriber element such that chatter of the tool during the line scribing operation is eliminated.

Another object is the provision of a precision vernier scribing tool which is simple in construction yet is durable in use and efficient in operation.

Still another object is the provision of support and guide surfaces on a vernier scribing tool which are in the form of rollers and which rollers are capable of pivoting about an axis parallel to the surface of the work piece being scribed to facilitate use of the tool without sacrificing the accuracy of the results.

The foregoing and other important objects and desirable features inherent in and encompassed by the invention, together with many of the purposes and uses thereof, will become readily apparent from a reading of the ensuing description in conjunction with the annexed drawing, in which:

Figure 1 is a side elevational view of a vernier scribing tool embodying the invention;

Figure 2 is an end elevational view of the vernier scribing tool shown in Figure 1;

Figure 3 is a view similar to the view in Figure 2 with the exception that the scribing element is shown in the position assumed thereby during the line scribing operation;

Figure 4 is a sectional view taken substantially along line 4—4 of Figure 1; and Figure 5 is a sectional view taken substantially along line 5—5 of Figure 1.

Referring to the drawings in detail, wherein like reference characters represent like elements throughout the various views, there is shown a vernier scribing tool having an elongated main body section 10. The body section 10 is rectangular in cross section as shown in Figure 4 and has a scribe-supporting leg 11 integrally formed with and extending substantially perpendicularly from one end of the body section 10. The body section 10 is provided with a scale 12, as shown in Figure 1. A vernier slide block 13 is slidably mounted on the body section 10. The slide block 13 is provided with an opening 14 for reading the scale 12 and the lower edge of the opening 14 is provided with markings 15 which when read in conjunction with the scale 12 specify accurately, within thousands of an inch, the position or spacing of the slide block 13 with respect to the scribe-support leg 11. Releasable locking means, in the form of a stud 15 threaded into the slide block 13 and engageable with the body section 10, is provided for clamping the slide block to the body section 10 in its adjusted position. It is to be understood that other releasable lock means could be employed without departing from the spirit and scope of the invention.

The inwardly facing surface 17 of the scribe-supporting leg 11 is ground flat and serves as the surface against which the scribe element 18 abuts. One end of the scribe element 18 is in the form of a sharp point 19 which is capable of scoring a work piece made of metal or other materials when drawn across the work piece. When assembled on the scribe-supporting leg 11 a flat surface 20 of the element 18 abuts the surface 17 of the leg 11 and the point 19 depends below the free end of the leg 11, as best illustrated in Figure 1. The scribe element 18 is detachably secured to the leg 11 by means of a clamp device, designated generally by numeral 21. The clamp device 21 includes a substantially U-shaped member 22 having a bight portion 23 and a pair of spaced legs 24. The legs 24 embrace the leg 11 and the shank 25 of the scribe element 18. As shown in Figures 1 and 5, sections of the oppositely facing side surfaces of the shank 25 are cut away to provide a pair of L-shaped ledges 26. The ledges 26 extend from the end of the shank 25 opposite the point 19. As shown in Figure 5, the free end of each leg 24 is provided with an inwardly directed projection 27, each of which is adapted to slidingly engage a respective ledge 26. A stud 28 is threaded into the bight portion 23 and is adapted to releasably clamp the scribe element 18 to the scribe-supporting leg 11. It will be noted that the scribe element point 19 is so designed and secured to the leg 11 that the point 19 lies in the same plane as the "0" mark on the scale 12. When it is desired to remove the scribe element 18 as when the point 19 becomes dull and needs sharpening it is only necessary to loosen the stud 28 sufficiently to permit the scribe element to slide downwardly, as viewed in Figure 1, with respect to the leg 11. It is to be understood that other clamping devices could be employed for releasably securing the scribe element 18 to the leg 11 without departing from the spirit and scope of the invention.

Integrally formed with and depending from the lower edge of the vernier slide block 13 is a vernier jaw 29. The vernier jaw 29 is slotted, as shown in Figure 1, to provide a pair of spaced and parallel legs 30, 31. It will be noted that the leg 30 is shorter in length than the leg 31 and has an aperture 32 extending therethrough in axial alignment with a threaded aperture 33 formed in the leg 31. A generally rectangularly shaped plate 34 is disposed between the legs 30 and 31 and the upper central portion thereof is provided with an aperture 35 adapted to register with the apertures 32 and 33. A pivot pin 36 in the form of a shoulder bolt extends through the apertures 32 and 35 and is threaded into the aperture 33. The plate 34 is free to pivot but is prevented from moving axially by the inwardly facing surfaces of legs 30 and 31. From the foregoing, it will be appreciated that the plate 34 is connected to the vernier slide 13 for pivotal movement about an axis spaced from and parallel to the longitudinal axis of the body section 10.

In order to limit the amount of pivotal movement permitted between the plate 34 and the body section 10 stop means are provided. The stop means includes an arcuate slot 37 extending through the plate 34. The upper end of the short leg 30 is provided with an aperture 38 therethrough which is in alignment with a threaded aperture 39 formed in the leg 31. A stop pin 40 in the form of a shoulder bolt, extends through the aperture 38 and the slot 37 and is threaded into the aperture 39. It will be obvious that movement of the plate 34 in one direction is limited to the position where the stop pin 40 engages one end of the slot 37 and, conversely, movement of the plate 34 in the opposite direction is limited to the position where the stop pin 40 engages the opposite end of the slot 37.

As shown in Figures 2, 3, and 4, the lowermost corners of the plate 34 are provided with integrally formed, downwardly and outwardly projecting tabs 41, each of which has a threaded aperture 42 formed therethrough. A shoulder bolt 43 is threaded in each aperture 42 and each bolt 43 serves as pivot pin for a guide and support roller 44. Each roller 44 has a central opening in which an anti-friction bearing unit 45 is secured. The anti-friction bearing units 45, in turn, are mounted on the shoulder bolts 43. Each roller 44 includes an annular section 46 having a radially extending, annular guide surface 47 lying in the same plane as the inwardly facing surface 48 of the vernier jaw 29 and the "0" mark of the vernier scale 15. Thus, when the surface 48 engages the inwardly facing surface 49 of the scribe element 18 (which also lies in the plane of the scribe element point 19 and the "0" mark on the scale 12) the "0" marks on the scale 12 and the vernier scale 15 will be in alignment and the annular guide surfaces 47 of the rollers 44 will lie in the plane of the point 19.

Each roller 44 also includes an annular section 50 integrally formed with and of smaller diameter than the annular section 46. The annular section 50 is provided with an axially extending, annular supporting surface 51 which extends inwardly from a respective guide surface 47.

In use, assuming it is desired to scribe a line on a work piece surface, indicated by numeral 52, a particular distance from and parallel to a surface, indicated by numeral 53 disposed at right angles to the surface 52, the slide lock stud 15 is loosened and the slide block 13 is moved away from the point 19 the particular distance as read from the scale 12 and the vernier 15 and the slide block 13 is locked to the body section 10 by tightening the stud 15. Portions of the spaced, annular guide surfaces 47 of the rollers 44 are placed in firm abutting engagement with the surface 53 of the work piece. The supporting surfaces 51 are also caused to firmly engage the edge of the work piece surface 52 adjacent the surface 53. The scribe element 18 and the body section 10 are then pivoted about pivot pin 36 with respect to the plate 34 until the stop pin 40 engages one end of the slot 37.

The direction the scribe element 18 and the body section 10 is pivoted and the particular end of the slot in which the stop pin 40 is disposed depends on the direction of travel the scribe element 18 is moved over the work piece surface 52. As shown in Figure 3, when the tool is moved to the right as indicated by arrow 54 the body section 10 and the scribe element 18 are pivoted clockwise until the stop pin 40 engages the right hand end of the slot 37. Conversely, when the tool is moved to the left, as viewed in Figure 3 and indicated by arrow 54, the scribe element 18 is pivoted counterclockwise and the stop pin 40 engages the left hand end of the slot 37. By permitting the scribe element 18 to be canted in a direction opposite to the direction of tool travel so as to be dragged over the work piece surface 52 rather than pushed into such surface during the scribing operation chattering of the tool is prevented and more accurate scribing is obtained. Furthermore frictional resistance between the guiding and supporting surfaces 47 and 51 and the work piece surfaces 53 and 52, respectively, which could if too great, result in inaccurate scribing, is reduced to a minimum by providing rolling contact between the engaging surfaces rather than mere sliding contact. It will also be appreciated that by spacing the rollers 44 and the guiding and supporting surfaces 47, 51 associated therewith with respect to each other as well as the point 19, the tool is firmly supported and accurately guided during the scribing operation and the pressure required by the user to cause the point 19 to scribe a line on the work piece is small when compared with the pressure required in prior devices. Thus, the accuracy, efficiency and ease of operation of the tool is enhanced.

The embodiment of the invention chosen for the purposes of illustration and description herein is that preferred for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other modifications and adaptions of the invention as fall within the spirit and scope of the invention as defined in the appended claims.

What is claimed is:

1. A vernier scribing tool for scribing a line on a surface of a work piece parallel to a second surface perpendicular to the surface to be scribed, comprising a pair of relatively movable jaws adapted to be adjusted with respect to each other to vary the spacing therebetween; a scribe element point; means for releasably securing said scribe element point to one of said jaws; support means for engaging the surface of said work piece to be scribed; guide means for engaging said second surface of said work piece; and means for operatively connecting said support means and guide means to said jaw not having the scribe element point secured thereto for pivotal movement with respect to said scribe element point about an axis lying in the plane containing said jaws.

2. A vernier scribing tool as set forth in claim 1, further including stop means for limiting the pivotal movement permitted between said support means and said guide means with respect to said scribe element point.

3. A vernier scribing tool for scribing a line on a surface of a work piece parallel to a second surface perpendicular to the surface to be scribed, comprising, a pair of relatively movable jaws adapted to be adjusted with respect to each other to vary the spacing therebetween; a scribe element point; means for releasably securing said scribe element point to one of said jaws; a supporting surface for engaging the surface of the work piece to be scribed; a guide surface for engaging said second surface of said work piece; and means for operatively connecting said supporting and guiding surfaces to said jaw not having the scribe element point secured thereto for pivotal movement with respect to said scribe element point about an axis lying in the plane containing said jaws.

4. A vernier scribing tool as set forth in claim 3, further including stop means for limiting the pivotal movement permitted between said supporting and guiding surfaces with respect to said scribe element point.

5. A vernier scribing tool for scribing a line on a surface of a work piece parallel to a second surface perpendicular to the surface to be scribed, comprising, an elongated body section having a scale thereon; a fixed jaw formed with said body section and extending from one end thereof; a scribe element having a point on one end thereof; means for releasably securing said scribe element to said jaw whereby said point is in alignment with the zero mark of said scale; a movable jaw slidably mounted upon said body section adapted to be adjusted along the longitudinal axis thereof with respect to said fixed jaw, said jaw having a surface facing said point and a vernier scale for cooperation with the scale on said body section for indicating the spacing between said point and said point-facing surface of said movable jaw; support means pivotally connected to said movable jaw for engaging the surface of said work piece to be scribed; and guide means pivotally connected to said movable jaw for engaging said second surface of said work piece, said guide means being in alignment with said point-facing surface of said movable jaw, said support means and said guide means being pivotal with respect to said scribe element about an axis perpendicular to said point-forming surface of said movable jaw.

6. A vernier scribing tool for scribing a line on a surface of a work piece parallel to a second surface perpendicular to the surface to be scribed, comprising, an elongated body section having a scale thereon; a fixed jaw formed with said body section and extending perpendicularly from one end thereof; a scribe element having a point on one end thereof; means for releasably securing said scribe element to said jaw whereby said point is in alignment with the zero mark of said scale; a movable jaw slidably mounted upon said body section adapted to be adjusted along the longitudinal axis thereof with respect to said fixed jaw, said jaw having a surface facing said point and a vernier scale for cooperation with the scale on said body section for indicating the spacing between said point and said point-facing surface of said movable jaw; a guide surface for engaging said second surface of said work piece; and means for pivotally connecting said guiding surface to said movable jaw, said guiding surface being in alignment with said point facing surface of said movable jaw.

7. A vernier scribing tool as set forth in claim 6, wherein said means for pivotally connecting said guiding surface to said movable jaw includes a plate having the guiding surface carried thereby, and pivot pin means for connecting said plate to said movable jaw for pivotal movement about an axis spaced from and parallel to the longitudinal axis of said body section.

8. A vernier scribing tool as set forth in claim 7, further including stop means for limiting the pivotal movement permitted between said plate with respect to said movable jaw.

9. A vernier scribing tool for scribing a line on a surface of a work piece parallel to a second surface perpendicular to the surface to be scribed, comprising, an elongated body section having a scale thereon; a fixed jaw formed with said body section and extending perpendicularly from one end thereof; a scribe element having a point on one end thereof; means for releasably securing said scribe element to said jaw whereby said point is in alignment with the zero mark of said scale; a movable jaw slidably mounted upon said body section adapted to be adjusted along the longitudinal axis thereof with respect to said fixed jaw, said jaw having a surface facing said point and a vernier scale for cooperation with the scale on said body section for indicating the spacing between said point and said point-facing surface of said movable jaw; a pair of spaced supporting surfaces for engaging the surface of the work piece to be scribed; a pair of spaced guide surfaces for engaging said second surface of said work piece; and means for pivotally connecting said supporting and guiding surfaces to said movable jaw, said guiding surfaces lying in the same plane containing said point-facing surface of said movable jaw.

10. A vernier scribing tool as set forth in claim 9, wherein said means for pivotally connecting said supporting and guiding surfaces to said movable jaw includes a plate movable longitudinally with said movable jaw with respect to said body section and having the pairs of supporting and guiding surfaces carried thereby, and pivot pin means for connecting said plate to said movable jaw for pivotal movement about an axis spaced from and parallel to the longitudinal axis of said body section.

11. A vernier scribing tool as set forth in claim 10, further including stop means for limiting the pivotal movement permitted between said plate with respect to said movable jaw.

12. A vernier scribing tool for scribing a line on a surface of a work piece parallel to a second surface perpendicular to the surface to be scribed, comprising, an elongated body section having a scale thereon; a fixed jaw formed with said body section and extending perpendicularly from one end thereof; a scribe element having a point on one end thereof; means for releasably securing said scribe element to said jaw whereby said point is in alignment with the the zero mark of said scale; a movable jaw slidably mounted upon said body section adapted to be adjusted along the longitudinal axis thereof with respect to said fixed jaw, said movable jaw having a pair of spaced, depending legs, one of said legs having a surface facing said point, said movable jaw having a vernier scale for cooperation with the scale on said body section for indicating the spacing between said point and said point-facing surface of said movable jaw leg; a plate disposed between said movable jaw legs; pivot pin means carried by said legs and extending through said plate for pivotally connecting said plate to said legs for movement about an axis parallel and spaced from the longitudinal axis of said body section; a pair of spaced rollers, each of said rollers being rotatably connected to said plate for rotational movement about an axis spaced from and parallel to the rotational axis of the other roller and the pivotal axis of said plate, each of said rollers having a first annular section provided with an annular radially extending guiding surface for engaging said second surface of said work piece and a second annular section of smaller diameter than said first section provided with an annular, axial extending supporting surface for engaging the surface of said work piece to be scribed, said annular guiding surfaces lying in the plane of said point-facing surface of said movable jaw leg; and stop means for limiting the pivotal movement of said plate with respect to said movable jaw legs.

13. A vernier scribing tool as set forth in claim 12, wherein said stop means includes an arcuate slot formed through said plate, and a stop pin carried by said movable jaw legs extending longitudinally through said slot, said stop pin being adapted to engage the ends of said slot to limit pivotal movement of the plate.

14. A vernier scribing tool for scribing a line on a surface of a work piece, comprising, a pair of relatively movable jaws adapted to be adjusted with respect to each other to vary the spacing therebetween; a scribe element point carried by one of said jaws; support means for engaging the surface of said work piece to be scribed; and means for operatively connecting said support means to said jaw not having the scribe element point secured thereto for pivotal movement with respect to said scribe element point about an axis lying in the plane containing said jaws.

15. A vernier scribing tool for scribing a line on a surface of a work piece parallel to a second surface perpendicular to the surface to be scribed, comprising, a pair of relatively movable jaws adapted to be adjusted with respect to each other to vary the spacing therebetween; a scribe element point; support means for engaging the surface of said work piece to be scribed; guide means for engaging said second surface of said work piece; and means for operatively connecting said scribe element point to one of said jaws and said support means connected and guide means to the other of said jaws for relative pivotal movement about an axis perpendicular to the plane containing said second surface.

References Cited in the file of this patent
UNITED STATES PATENTS

| | | |
|---|---|---|
| 1,594,482 | Wentz et al. | Aug. 3, 1926 |
| 1,753,191 | Armstrong | Apr. 8, 1930 |
| 2,529,931 | Gallup | Nov. 14, 1950 |